Patented June 29, 1943

2,322,974

UNITED STATES PATENT OFFICE 2,322,974

AMINO ARYL SULPHONAMIDES

Arnold Salomon, Oss, Netherlands; vested in the Alien Property Custodian

No Drawing. Application December 22, 1939, Serial No. 310,629. In the Netherlands August 6, 1937

7 Claims. (Cl. 260—397.7)

This invention relates to a new group of chemical compounds and the method of their preparation. More specifically, it relates to amino aryl sulphonamides substituted in the amide nitrogen by an aryl sulphonyl radical, preferably an amino aryl sulphonyl radical so as to form a di (amino aryl sulphon) amide. It also includes compounds of this type in which there are further substitutions in the aryl nuclei or the terminal amino groups, and the salts of all of the compounds described.

Compounds such as p-aminobenzenesulphonamide are known and known to have considerable therapeutic value. They suffer from the disadvantages, however, of having generally relatively low solubilities and relatively high toxicities. Accordingly it is the object of this invention to provide therapeutically valuable compounds without these disadvantages. It has been found possible to do this and also to increase the therapeutic effectiveness of the products by making certain substitutions in the amide nitrogen of the compounds.

A typical formula for an amino aryl sulphonamide is the formula for p-amino benzene sulphonamide:

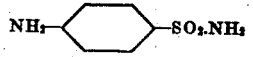

If this compound, or a compound differing therefrom in that it has a polynuclear aryl portion, or non-interfering substituents in the ring system or amino group, be substituted in the amide nitrogen by an aryl sulphonyl radical, preferably an amino aryl sulphonyl radical, a general lowering of the toxicity is accomplished. Furthermore, the new compound and particularly its alkali metal salts, which can easily be formed, are quite soluble, and their therapeutic properties are, in general, greatly augmented. Still other derivatives may be made by attaching alkyl or aryl radicals to the amide nitrogen.

These new compounds may be prepared by causing two molecules of the structure

Ac standing for an acyl group and Hlg for a halogen, to react with one molecule of a substance having the general formula H₂NR, in which R stands for a group from the class comprising H, alkyl, an isocyclic and a heterocyclic compound.

It is supposed that the reaction proceeds in two steps. In the first step one of the two hydrogen atoms in the H₂NR molecule is substituted, whereas in the second step the second hydrogen atom is substituted. In both steps the substitution is caused by the splitting off of hydrogen halide from the reacting molecules.

From the foregoing it follows that the first step can be avoided by taking as a starting material the product of this first step, which product is p-aminobenzene-sulphonamide or one of its acyl derivatives. Hence, the reaction between

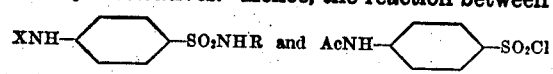

to form

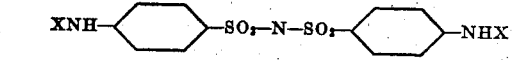

falls within the scope of my invention. (Ac, X and R have the same meaning as stated above.)

In carrying out the condensation with unacylated p-aminobenzene-sulphonamide, thus X being H, the reaction may take a different course, products of the general formula

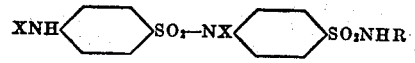

being formed.

If it is desired to avoid the formation of these by-products one may either start with p-acyl derivatives of p-aminobenzene-sulphonamide, in which case the amino group is protected against substitution, or carry out the reaction in an alkaline solution. It has been found that in alkaline solutions the formation of by-products is reduced to a great extent.

The new compounds have excellent coccocidal properties.

During the reaction generally the acyl groups are subsequently saponified.

It is a further object of this invention to provide neutral solutions of derivatives of p-aminobenzene-sulphonamide. It is well known that p-aminobenzene-sulphonamide itself is only soluble in acid solutions. Some of the new compounds obtained by the process of this invention, however, have the property of forming soluble alkali salts.

If in the general formula

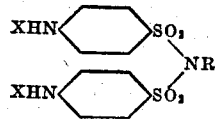

R=H, this hydrogen atom can be substituted by an alkali metal. The solutions of these alkali salts can easily be adjusted to pH 7, 2, the pH of normal blood. The sodium salts are especially well suited for injection. The salts have the same therapeutic value as the substances themselves.

In order to facilitate a clear understanding the following examples are given:

Example 1

40 g. of p-aminobenzene-sulphonamide are suspended in 200 cc. of sodiumhydroxide of 25% strength. To the suspension, which is continuously stirred, 60 g. of p-acetylamino-benzene-sulphonylchloride are added in small portions. Condensation takes place with evolution of heat, the hydrochloric acid liberated being neutralized by the sodium hydroxide. After the reaction has slowed down the reaction mixture is further heated for half an hour on a steam bath. After cooling part of the di-(p-amino benzene-sulphonyl) amide-sodium crystallizes; it is filtered with suction. From the mother liquor a further crop is precipitated with ethanol. Yield: 80% of the theoretical yield.

The product can be purified by recrystallisation from ethanol. In this way white needles are obtained which are easily soluble in water to at least 20%. The pH of such a solution may be adjusted to 7.2.

*Example 2*

25 g. of p-acetylamino-benzene sulphonamide, 25 g. of p-acetylamino-benzene-sulphonylchloride and 140 cc. of water are boiled with reflux for one hour. The acid reaction mixture is cooled down. 7 g. of acids, presumably sulphanilic acid and its acetyl derivatives, crystallize and are filtered off. After neutralization of the filtrate 13 g. of p-acetylamino-benzene-sulphonamide crystallize and after evaporation of a large part of the solvent another 7 g. of this compound are obtained. The fitrate is now evaporated to dryness. The residue is recrystallized from ethanol. Yield 7 g. of a compound which is supposed to be di-(amino-benzene-sulphonyl) amide.

*Example 3*

23 g. of p-acetyl-amino-benzene-sulphylchloride are boiled under reflux for one hour with 100 cc. of water and 4 cc. of 25% ic ammonia. The liquid reacts as acid with respect to Congo and is therefore neutralized with sodium carbonate. The solution is evaporated on a steam bath and the residue recrystalized from ethanol. Yield 7 g. The acetyl groups appear to have been split off during the reaction.

The new compounds may also contain more than two sulphonyl residues. The process according to which these new derivatives are prepared is analogous to the process used above in that the condensation is effected by the interaction of a compound carrying an —SO₂-halogen group and a compound carrying an —NH₂-group. By the interaction hydrogen halide is split off and thus the condensation is effected by the formation of an —SO₂—NH-group. The process of splitting off hydrogen halide from a compound containing an —SO₂-halogen group and a compound containing an —NH₂-group is not new in itself; it is, however, surprising that it leads to derivatives with more than two p-iminobenzene-sulphonyl residues per molecule which are therapeutically active and devoid of the disadvantages of p-aminobenzene-sulphonamide.

The starting materials for the process of the present invention are numerous, the only conditions being that (a) A SO₂-halogen group be present in one of the components;

(b) A free NH₂-group be present in the other component;

(c) A compound with more than two p-imino-benzenesulphonyl residues being formed by the splitting off of hydrogen halide.

Amino groups which are not to enter into reaction are preferably protected e. g. by acylation or alkylation.

It is to be understood that this invention only contemplates such compounds which somewhere in the molecule contain the group

only derivatives containing this group being capable of forming easily soluble metal derivatives, especially alkali metal, e. g. sodium derivatives which have the character of salts.

Accordingly the simplest products of the present invention are the di-(p-aminobenzenesulphonyl) p'-iminobenzene-sulphonimid.

its derivatives, acylated or alkylated in one or both of the terminal NH₂ groups and their salts.

According to the above these compounds can be prepared in a number of ways e. g. by the interaction of:

(1)
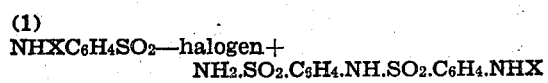

(2)
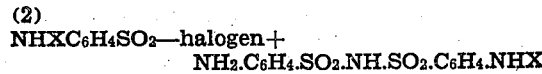

(3)
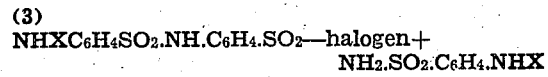

(4)
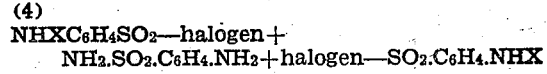

(which can also be written as:

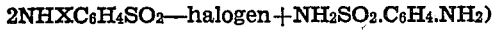

Herein X stands for a hydrogen, acyl or alkyl. If desired, the acyl or alkyl groups may be saponified, substances with free NH₂ groups being formed. The latter can then serve again for a further condensation with compounds from this class containing an —SO₂-halogen group whereby compounds with 4,5 or more p-aminobenzene-sulphonyl groups in the molecule are formed.

The condensation is accomplished readily by simply dissolving or suspending the components in water and shaking or boiling the solution or suspension for a long time. The reaction may also be carried out in an alkaline medium for which purpose the reaction solution may be made alkaline, e. g. with the carbonates of the alkali or earth-alkali metals or pyridine or dilute alkali-hydroxide (the latter method is known as Schotten-Baumann method).

The product referred to above, di-(p-aminobenzene - sulphonyl) - p'- iminobenzenesulphonimid, its derivatives acylated in the terminal NH₂ groups and its salts have the properties of being active in combatting streptococcus and gonococcus infections, of having a very low toxicity and of being soluble at approximately neutral reaction in the form of salts, e. g. of the alkali metals. A neutral solution containing about 1% is absolutely harmless to animal and human tissues and is accordingly suitable even for use in ophthalmology, e. g. in combatting conjunctivitis.

In order to secure a clear understanding of this phase of the invention the following examples are given by way of illustration.

*Example 4*

33.7 g. of di-(p-aminobenzenesulphonyl)-amine in which one NH₂ group has been acetylated

are dissolved with 23.3 g. of p-acetylaminobenzene-sulphonyl-chloride in 100 cc. of water and boiled for some hours. It is preferred to add also 15 g. of sodium carbonate for neutralization of the hydrochloric acid formed.

After termination of the reaction the solution is allowed to cool just to room temperature, afterwards in a refrigerating mixture. A part of the di (p-acetyl-aminobenzenesulphonyl)-p'-iminobenzene sulphonimid crystallizes and is filtered with suction. The sodium salt which is formed with sodium hydroxide or sodium carbonate can be recrystallized from ethanol.

From the mother liquor a further quantity is obtained by evaporation. Here too the purification can be effected by recrystallization of the sodium salt from ethanol.

*Example 5*

33.7 g. of p-acetylaminobenzene sulphonyl-p'-iminobenzenesulphonamide

are dissolved with 23.3 g. of p-acetylaminobenzenesulphonylchloride in 100 cc. of water and boiled for some hours. A quantity of sodium carbonate similar to that used in Example 4 may be added. The reaction mixture is worked up according to Example 4.

*Example 6*

17.2 g. (=0.1 mol) of p-aminobenzenesulphonamide and 46.6 g. (=0.2 mol) of p-acetylaminobenzene sulphonylchloride are suspended in 100 cc. of water and boiled for some time. The mixture is then worked up according to Example 4.

It is to be understood that many variations of the specific compounds given as illustrations are possible within the skill of those who are familiar with this art and that the compounds and reactions given are illustrative rather than indicative of the scope of this invention.

Broadly, this invention includes all compounds in which two aryl nuclei are attached through sulphonyl groups to a trivalent nitrogen atom and one, at least, of the aryl nuclei has an amine group directly attached thereto. The position of this group is not of primary importance nor is the fact that there are or are not other substituents attached to either of the aryl rings or the connecting nitrogen. A hydrogen atom, a metal atom, an alkyl radical, or another aryl nucleus may occupy the third valence of this nitrogen atom.

Preferably, however, both of the essential aryl nuclei will have amino groups attached thereto and it is in many cases advantageous to attach a substituent such as an acyl or an aminoaryl or an aminoaryl sulphonyl group to one of the essential aryl groups through its amine group. In most instances the amine groups will probably be in the para position although this, too, is not essential.

This application is a continuation-in-part of my applications Serial Nos. 237,319 and 222,535.

What I claim is:

1. Disulphonamides having the following formula:

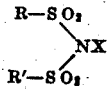

in which R is an aminoaryl radical, R' is a mononuclear aryl radical and X is a member of the group consisting of hydrogen, a metal, an alkyl radical and an aryl radical.

2. Di(aminoarylsulphon) amides having the following general formula:

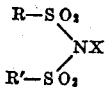

in which R is an aminoaryl radical, R' is a mononuclear aryl radical containing at least one amino group or substituted amino group and X is a member of the group consisting of hydrogen, a metal, an alkyl radical and an aryl radical.

3. Di(aminoarylsulphon) amides having the following formula:

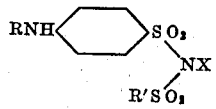

in which R is hydrogen, an acyl or an aminoarylsulphonyl radical, R' is an aminoaryl radical and X is a member of the group consisting of hydrogen, a metal, an alkyl radical and an aryl radical.

4. Disulphanilamides having the following formula:

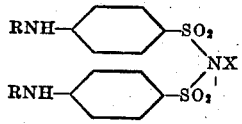

in which R is a member of the group consisting of hydrogen, an acyl and an aminoaryl radical and X is a member of the group consisting of hydrogen, a metal, an alkyl radical and an aryl radical.

5. Di(aminobenzenesulphonyl) amide having the following formula:

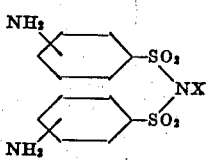

in which X is a member of the group consisting of hydrogen, a metal, an alkyl radical and an aryl radical.

6. Disulphanilamides having the following formula:

in which X is a member of the group consisting of hydrogen, a metal, an alkyl radical and an aryl radical.

7. A soluble salt of disulphanilamide having the following formula:

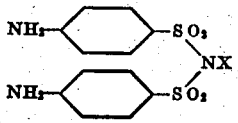

in which X is a metal forming a water-soluble salt of disulphanilamide.

ARNOLD SALOMON.